US010732081B2

(12) United States Patent  
Kocher et al.

(10) Patent No.: US 10,732,081 B2  
(45) Date of Patent: Aug. 4, 2020

(54) PORTABLE AIR SAMPLER

(71) Applicant: Veltek Associates, Inc., Malvern, PA (US)

(72) Inventors: Nathan G. Kocher, Malvern, PA (US); Arthur L. Vellutato, Jr., Malvern, PA (US); Jeffrey Churchvara, Downingtown, PA (US); Mark A. Phillips, King of Prussia, PA (US)

(73) Assignee: Veltek Associates, Inc., Malvern, PA (US)

( * ) Notice: Subject to any disclaimer, the term of this patent is extended or adjusted under 35 U.S.C. 154(b) by 231 days.

(21) Appl. No.: 15/243,403

(22) Filed: Aug. 22, 2016

(65) Prior Publication Data

US 2018/0045619 A1 Feb. 15, 2018

Related U.S. Application Data

(63) Continuation of application No. 29/574,405, filed on Aug. 15, 2016, now Pat. No. Des. 877,924.

(Continued)

(51) Int. Cl.  
*G01N 1/22* (2006.01)  
*G01N 1/24* (2006.01)

(52) U.S. Cl.  
CPC ......... *G01N 1/2226* (2013.01); *G01N 1/2214* (2013.01); *G01N 1/2273* (2013.01);  
(Continued)

(58) Field of Classification Search  
CPC ............... G01N 1/2226; G01N 1/2273; G01N 2001/2285

(Continued)

(56) References Cited

U.S. PATENT DOCUMENTS 2,824,575 A 2/1958 Rosen  
3,795,020 A * 3/1974 Bartholomew ........ A47B 23/02  
108/49

(Continued)

OTHER PUBLICATIONS

International Search Report and Written Opinion for PCT/US2017/042722, dated Sep. 27, 2017, 10 pages.

(Continued)

*Primary Examiner* — Marrit Eyassu  
(74) *Attorney, Agent, or Firm* — Blank Rome LLP (57) ABSTRACT

An air sampling device samples air in a controlled environment. The device includes a housing body having a top and a side. An opening is located at the top of the housing body. A retaining assembly retains a sampling device and atrium. The retaining assembly is located at the top of the housing body about the opening. A plenum has a top end and a bottom end, with the top end coupled to the top of the housing body about the opening so that the plenum is in flow communication with the opening. A mass flow meter has an input and an output, with the input coupled to the bottom end of the plenum and in flow communication with the bottom end of the plenum. A blower is located inside the plenum and is configured to draw air past the sampling device, through the opening, through the plenum, and through the mass flow meter. The mass flow meter detects a flow rate of air through the mass flow meter. And a controller receives the detected flow rate from the mass flow meter and controls a speed of the blower in response to the detected flow rate. The controller increases the speed of the blower if the detected flow rate is lower than a desired flow rate, and decreases the speed of the blower if the detected flow rate is higher than a desired flow rate.

17 Claims, 10 Drawing Sheets

Related U.S. Application Data (60) Provisional application No. 62/375,274, filed on Aug. 15, 2016.

(52) U.S. Cl.
CPC ............... *G01N 2001/2285* (2013.01); *G01N 2001/245* (2013.01)

(58) Field of Classification Search
USPC .................. 73/31.02, 863.34, 863.21, 863.2
See application file for complete search history.

(56) References Cited

U.S. PATENT DOCUMENTS

| | | | |
|---|---|---|---|
| 4,034,663 A | 7/1977 | Jenn et al. | |
| 4,091,674 A | 5/1978 | Amey | |
| 5,655,478 A | 8/1997 | Kiera | |
| 5,693,895 A * | 12/1997 | Baxter | G01N 1/2208 73/28.05 |
| 5,918,979 A * | 7/1999 | Martin | B01F 11/0005 366/211 |
| 6,405,549 B1 | 6/2002 | Baffes | |
| 6,481,050 B1 | 11/2002 | Wilson et al. | |
| 6,514,721 B2 * | 2/2003 | Spurrell | G01N 1/2205 435/287.5 |
| 6,565,638 B1 * | 5/2003 | Sugita | G01N 1/2273 73/28.05 |
| 6,702,664 B1 | 3/2004 | Coven | |
| 6,712,161 B1 | 3/2004 | Dai | |
| 7,752,930 B2 | 7/2010 | Kreikebaum et al. | |
| 8,956,571 B2 * | 2/2015 | Goldstein | G01N 21/783 422/400 |
| 9,046,453 B2 | 6/2015 | Calio et al. | |
| 9,063,040 B2 | 6/2015 | Calio et al. | |
| 9,285,792 B2 | 3/2016 | Churchvara et al. | |
| 10,060,837 B2 * | 8/2018 | Carter | G01N 1/2208 |
| 2003/0005761 A1 * | 1/2003 | Spurrell | G01N 1/2205 73/170.16 |
| 2003/0172744 A1 * | 9/2003 | Matsuzawa | G01F 1/38 73/861.42 |
| 2008/0087108 A1 | 4/2008 | Kreikebaum et al. | |
| 2011/0252897 A1 * | 10/2011 | Swenson | G01N 1/2208 73/863 |
| 2012/0225155 A1 * | 9/2012 | Lin | B29C 41/06 425/453 |
| 2012/0325024 A1 * | 12/2012 | Vidal-de-Miguel | G01N 27/622 73/863.24 |
| 2013/0105566 A1 | 5/2013 | Calio et al. | |
| 2013/0227929 A1 * | 9/2013 | Kulkarni | G01N 33/0016 60/39.091 |
| 2014/0075712 A1 | 3/2014 | Robertson et al. | |
| 2015/0259723 A1 | 9/2015 | Hartigan et al. | |
| 2015/0260617 A1 * | 9/2015 | Ketcham | G01N 1/2208 73/863.22 |
| 2015/0301019 A1 * | 10/2015 | Smith | G01N 33/497 73/23.3 |
| 2015/0355000 A1 * | 12/2015 | Bates | G01F 1/34 73/861.351 |
| 2016/0002700 A1 * | 1/2016 | Ketcham | G01N 1/2205 435/5 |
| 2016/0061796 A1 | 3/2016 | Miller et al. | |
| 2016/0061797 A1 | 3/2016 | Kocher | |
| 2016/0161474 A1 | 6/2016 | Husar et al. | |
| 2016/0363515 A1 * | 12/2016 | Ligugnana | G01N 1/24 |
| 2018/0126650 A1 | 5/2018 | Murphree et al. | |

OTHER PUBLICATIONS

Emtek Microbial Air Samplers; P100 Portable Microbial Air Sampler Users Manual; 2013; pp. 1-64.

MAS-100 NT™ Microbiological Air Sampler: The Leading Microbiological Air Monitoring Systems; Pictorial User Manual Hardware; 2008; 66 pgs.

SMA MicroPortable Air Samplers Operator's Manual, Veltek Associates, Inc.; SMA, Rev. 1, Oct. 16, 2013, 21 pages.

SMA MicroPortable Air Sampler; SMA, Veltek Associates, Inc., 2012; 2 pages.

International Search Report and Written Opinion for PCT/US2019/0012132, dated Feb. 14, 2019, 11 pages.

* cited by examiner

PORTABLE AIR SAMPLER

RELATED APPLICATIONS

This is a continuation of U.S. Design application Ser. No. 29/574,405, filed Aug. 15, 2016, and claims priority to provisional application No. 62/375,274, filed Aug. 15, 2016. The entire contents of those applications are incorporated herein by reference.

BACKGROUND OF THE INVENTION

Field of the Invention

The present invention relates to a device and method for collecting and analyzing air samples in a controlled, indoor environment. In particular, the present invention relates to devices and methods for collecting, processing, and analyzing air samples in clean rooms and remotely monitoring, logging, and controlling the sampling device.

Background of the Related Art

Controlled environments such as hooded areas and clean rooms (collectively referred to has "clean rooms") found in manufacturing, research, and other facilities are typically classified into two broad categories based on the static air pressure inside the rooms relative to atmospheric pressure and/or based on the air pressure in spaces adjacent the clean rooms. A positive air pressure room is maintained at an absolute air pressure greater than atmospheric pressure, greater than the air pressure in spaces adjacent the clean room, or both. The positive air pressure in such rooms is provided by pumping filtered and/or conditioned air into the rooms and controlling the flow of air out of the rooms. The adjacent spaces, which may be manufacturing facilities or offices, are typically maintained at or close to atmospheric pressure by heating, ventilation, and air conditioning (HVAC) systems, or by providing an opening to the environment that allows the adjacent spaces to equilibrate with atmospheric pressure. Thus, air flowing from the positive pressure clean room will flow toward the lower pressure in adjacent rooms or to the atmosphere.

When a positive air pressure clean room is breached, air flowing to adjacent spaces or the atmosphere is generally not a problem as long as airborne contaminants present in the clean room do not pose a potential adverse health effect to people in the adjacent spaces. Typically, the air inside clean rooms in which electronics, aerospace hardware, optical systems, military equipment, and defense-related research are manufactured or conducted may not contain airborne gases, vapors, and particulate matter at concentrations that present a safety or health concern to human health or the environment. However, that is not always the case, as other operations within those industries may generate contaminants that are above acceptable levels and, therefore, must be prevented from escaping the clean room without treatment.

A negative air pressure room is maintained at an absolute air pressure that is either less than atmospheric pressure, less than the air pressure in spaces adjacent the clean room, or both. The negative pressure is maintained by pumping air out of the room at a rate faster than that at which filtered and/or conditioned air is pumped into the room. Negative pressure rooms are often used when there is a concern that contaminants in the air in the room may pose a potential health threat to human health in adjacent spaces or the environment.

Notwithstanding the human health and environmental implications, certain types of manufacturing and research operations must be conducted within a positive air pressure clean room to satisfy regulatory requirements and industry-adopted good manufacturing and laboratory quality control standards. For example, state and federal regulations, including those promulgated by the National Institute for Occupational Safety and Health (NIOSH), may necessitate the use of positive or negative pressure clean rooms.

In particular, the U.S. Food & Drug Administration (FDA) requires that pharmaceutical production be done within the confines of clean rooms that provide for the validation and certification that manufactured batches of pharmaceutical products are being produced in a sanitary environment.

Various FDA regulations and standards also specify requirements for air sampling and/or air monitoring equipment to be used inside clean rooms to verify or validate the cleanliness of the facility during certain drug manufacturing activities. The regulations also provide for electronic data recording, accuracy, precision, and record-keeping relating to monitoring the air quality within clean rooms. Similar requirements are imposed on other industries, such as the biotechnology industry.

A number of patents and published applications teach systems for air sampling and monitoring in clean rooms and for monitoring and controlling one or more air sampling devices from a central location, such as for instance U.S. Pat. Nos. 9,285,792, 9,063,040, 9,046,453, and U.S. Patent Publication No. 2016/0061796.

Figure 8:
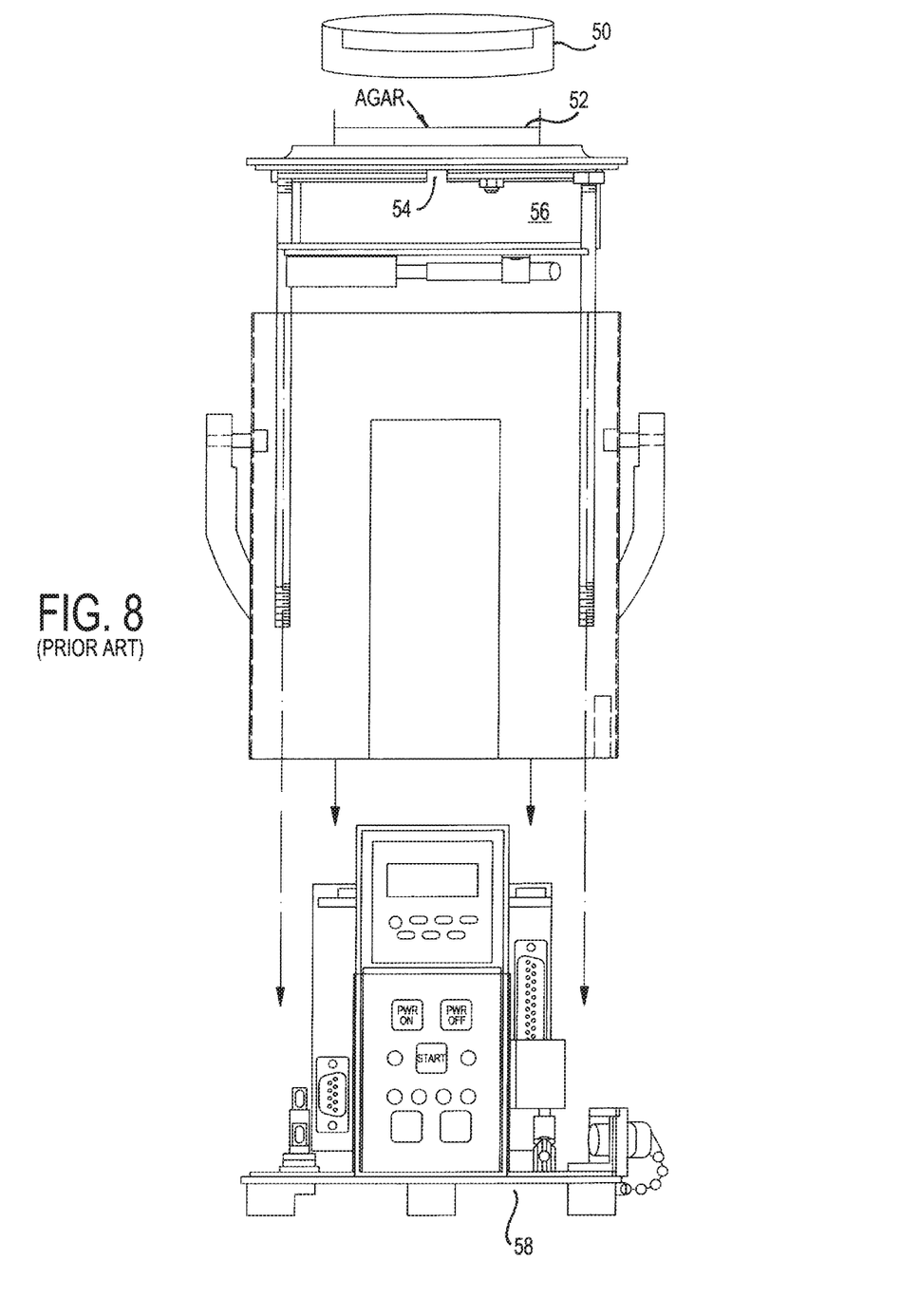
FIG. 8 is a conventional sampling device.

In addition, the Assignee Veltek Associates Inc. offers the portable sampling device shown in FIG. 8. As shown, air is drawn in through an atrium 50, across an agar media plate 52, and through an opening 54 at the bottom of the atrium rest. After passing through the hole 54, the air is drawn through a large fan 56 and exhausted through the body of the unit across the electronics and out of the bottom 58. The device is configured to operate at a constant fan speed that is proportional to the desired flow rate.

SUMMARY OF THE INVENTION

An air sampling device samples air in a controlled environment. The device includes a housing body having a top and a side. An opening is located at the top of the housing body. A retaining assembly retains a sampling device and atrium. The retaining assembly is located at the top of the housing body about the opening. A plenum has a top end and a bottom end, with the top end coupled to the top of the housing body about the opening so that the plenum is in flow communication with the opening. A mass flow meter has an input and an output, with the input coupled to the bottom end of the plenum and in flow communication with the bottom end of the plenum. A blower is located inside the plenum and is configured to draw air past the sampling device, through the opening, through the plenum, and through the mass flow meter. The mass flow meter detects a flow rate of air through the mass flow meter. And a controller receives the detected flow rate from the mass flow meter and controls a speed of the blower in response to the detected flow rate. The controller increases the speed of the blower if the detected flow rate is lower than a desired flow rate, and decreases the speed of the blower if the detected flow rate is higher than a desired flow rate.

These and other objects of the invention, as well as many of the intended advantages thereof, will become more readily apparent when reference is made to the following description, taken in conjunction with the accompanying drawings.

BRIEF DESCRIPTION OF THE FIGURES

A more complete appreciation of the invention and many of the attendant advantages thereof will be readily obtained as the same becomes better understood by reference to the following detailed description when considered in conjunction with the accompanying figures, wherein.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several preferred embodiments of the invention are described for illustrative purposes, it being understood that the invention may be embodied in other forms not specifically shown in the drawings.

Figure 1:
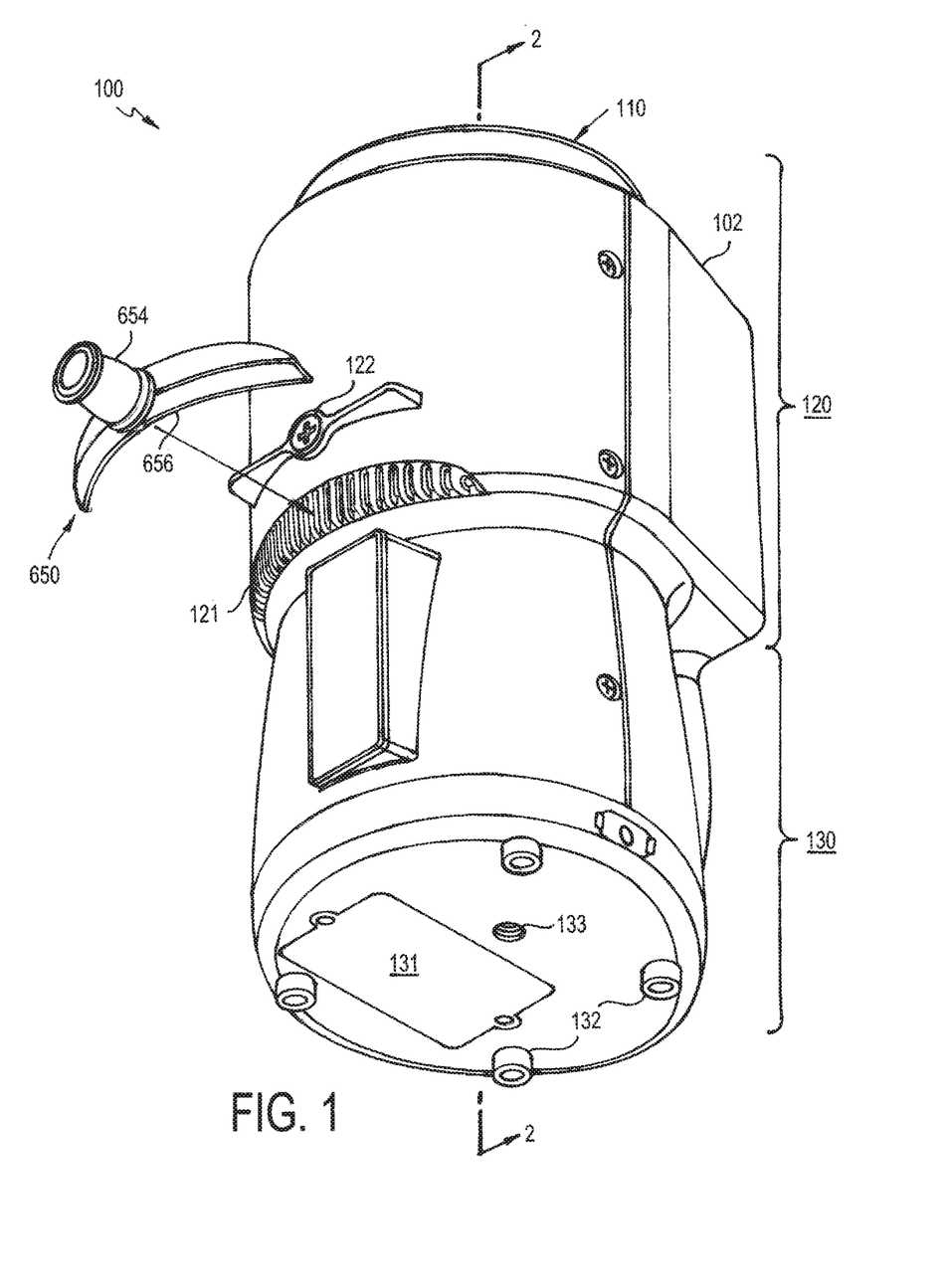
FIG. 1. is an exemplary embodiment of the invention, showing a bottom perspective external view of the air sampling device.
Figure 2:
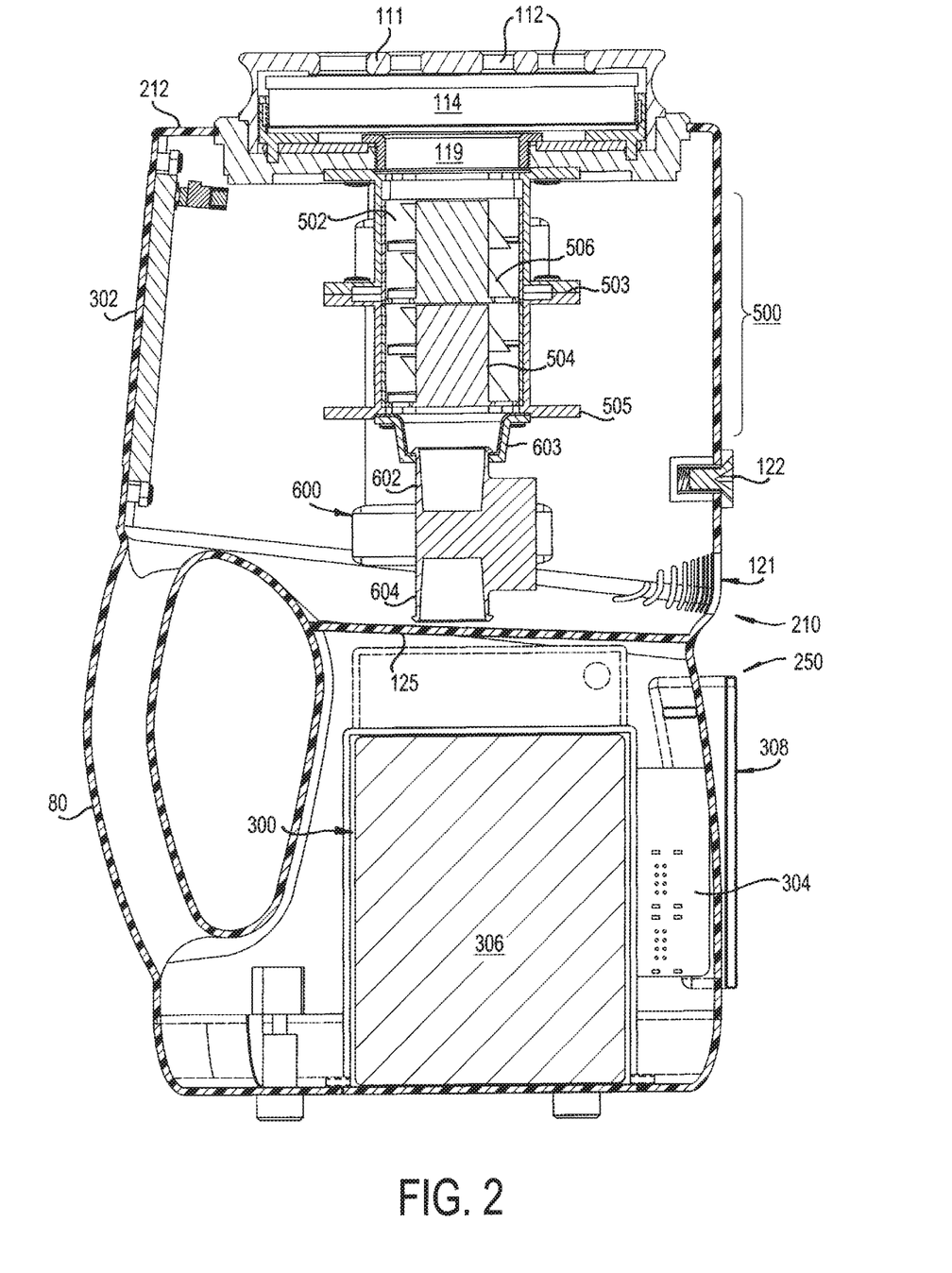
FIG. 2 is an exemplary embodiment of the invention, showing an internal cross-sectional view of the air sampling device.

FIGS. 1-2 show an exemplary embodiment of the air sampling device 100 of the invention. The device 100 is portable so it can be carried and placed at various locations within a controlled environment. As used herein, "air" refers generically to any and all gases, vapors, and particulates, and is not intended to limit the invention to particular types. The air sampling device 100 is especially useful to test for microscopic particulates in a clean room. The device 100 generally includes a sampler housing unit and a main body or housing 102. The sampler housing unit 110 can be any suitable device, such as a cover. In the embodiment shown is a Sterilizable Microbial Atrium (SMA) 110 that covers a media plate 114 that samples particulates in an air flow and can be autoclaved or otherwise sterilized. The atrium 110 protects the media plate 114, but allows air to flow through the atrium 110 to contact the media plate 114. The atrium 110 can be sterilized by heat or steam, and can be autoclaved. The sampling device 100 is configured for use in a clean environment such as a clean room.

The housing 102 is generally cylindrical in shape and has an upper body 120 and a lower body 130. As best shown in FIG. 2, the upper body 120 defines an upper interior space or upper chamber 210 that houses a blower assembly 500, and the lower body 130 defines a lower interior space or lower chamber 250 that houses certain electronic components 300. A wall or partition 125 separates the upper chamber 210 from the lower chamber 250. The entire main housing 102 is a single integral member. A handle 80 (FIG. 2) can be provided to carry the portable device 100. As shown, the handle 80 can connect from the bottom of the upper housing body 120 to the bottom of the lower housing body 130.

Upper and Lower Chambers 210, 250

Figure 4A:
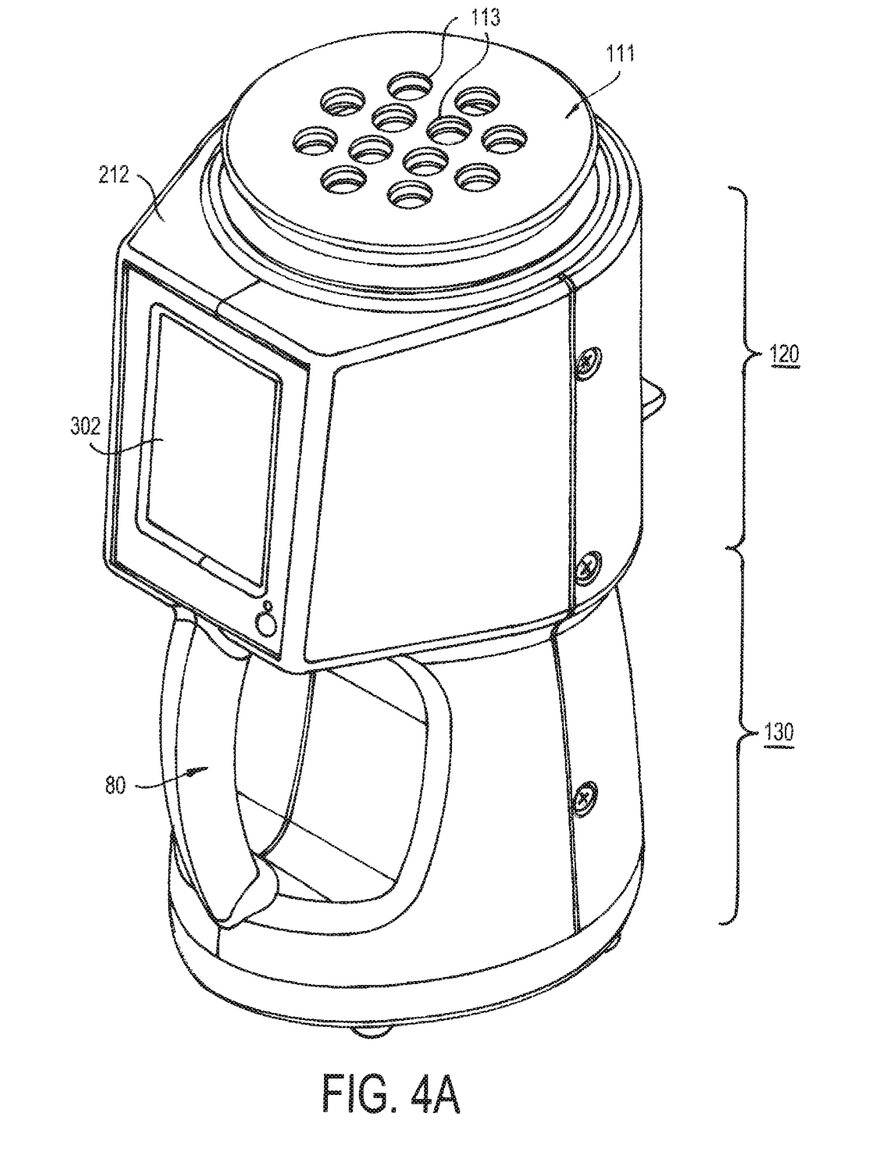
FIG. 4A is an exemplary embodiment of the invention, showing a top external perspective view of the air sampling device.
Figure 4B:
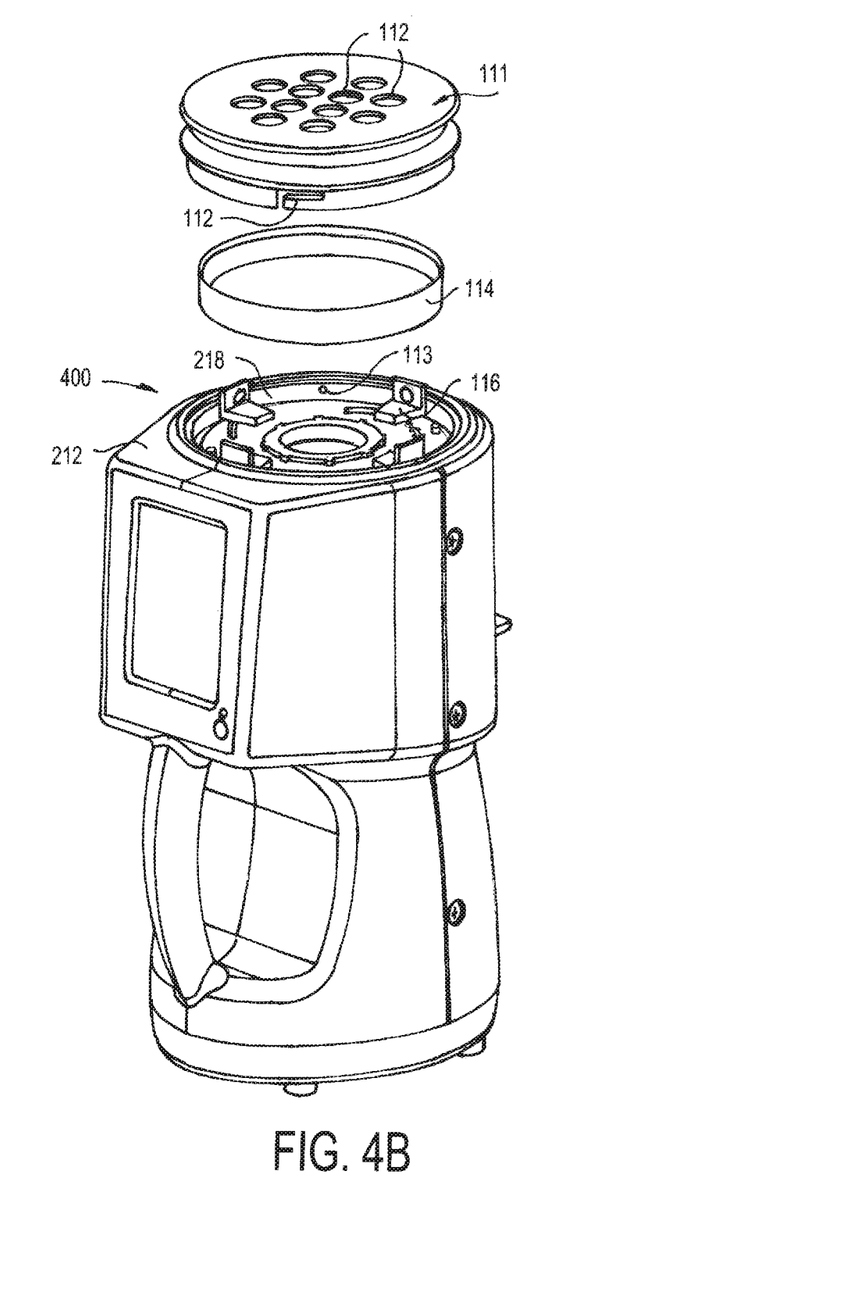
FIG. 4B is an exemplary embodiment of the invention, showing an exploded top external perspective view of the air sampling device.

The upper chamber 210 has a top 212 (FIGS. 4A, 4B), front (FIGS. 4A, 4B), rear (FIG. 1), and opposing sides that join the front and the rear. As best shown in FIGS. 4A, 4B, the top 212 of the upper chamber 210 removably couples to the atrium 110. Returning to FIGS. 1, 2, an elongated ventilation slot 121 and a support stand 122 are positioned at the rear of the upper chamber 210. The support stand 122 is an elongated member that receives a screw to fasten the stand 122 to the upper chamber 210. The stand 122 can be elongated and is configured to allow the device 100 to be level when in the substantially horizontal position, and to prevent the device 100 from inadvertently rolling or tipping to one side. In addition, a fastening mechanism such as an opening can be provided on the rear of the device 100 that is configured to mate with a tripod (FIG. 7B) to allow the air sampling device 100 to stand in a horizontal configuration. The fastening mechanism can be a threaded opening that threadably mates with a screw of the tripod.

Figure 7A:
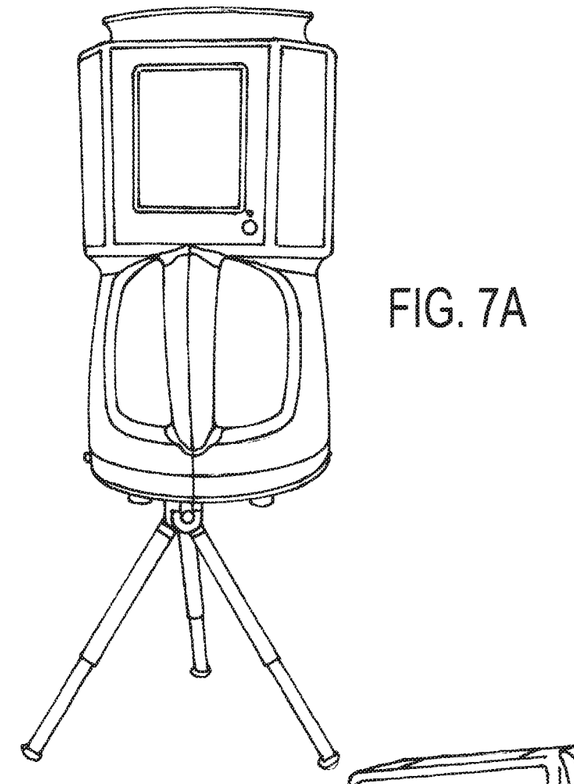
FIG. 7A shows the device in a vertical position and installed on a tripod.

The lower chamber 250 has a controller access panel 131, a plurality of vertical supports 132, and a vertical tripod receiver 133 (FIG. 7A). The access panel 131 provides access to the controller and may also provide an access point for a USB slot, and or a battery. The plurality of vertical supports 132 are situated along the bottom of the air sampling device 100 such that it is stable when free-standing. The vertical supports 132 may be coated with a high-friction material like rubber or a similar synthetic polymer in order to present the air sampling device 100 from sliding along a surface. The vertical tripod receiver 133 is configured to mate with a tripod (not shown) to allow the air sampling device 100 to stand in a vertical configuration. In certain embodiments, the vertical tripod receiver 133 is threaded, such that it will screw into the tripod. Thus, the device 100 can either stand vertically on supports 132 or be threaded to a tripod by the receiver 133. The device 100 can also stand horizontally on support stand 122, or be threaded to a tripod by a threaded receiver.

Retaining Assembly 400

Figure 5:
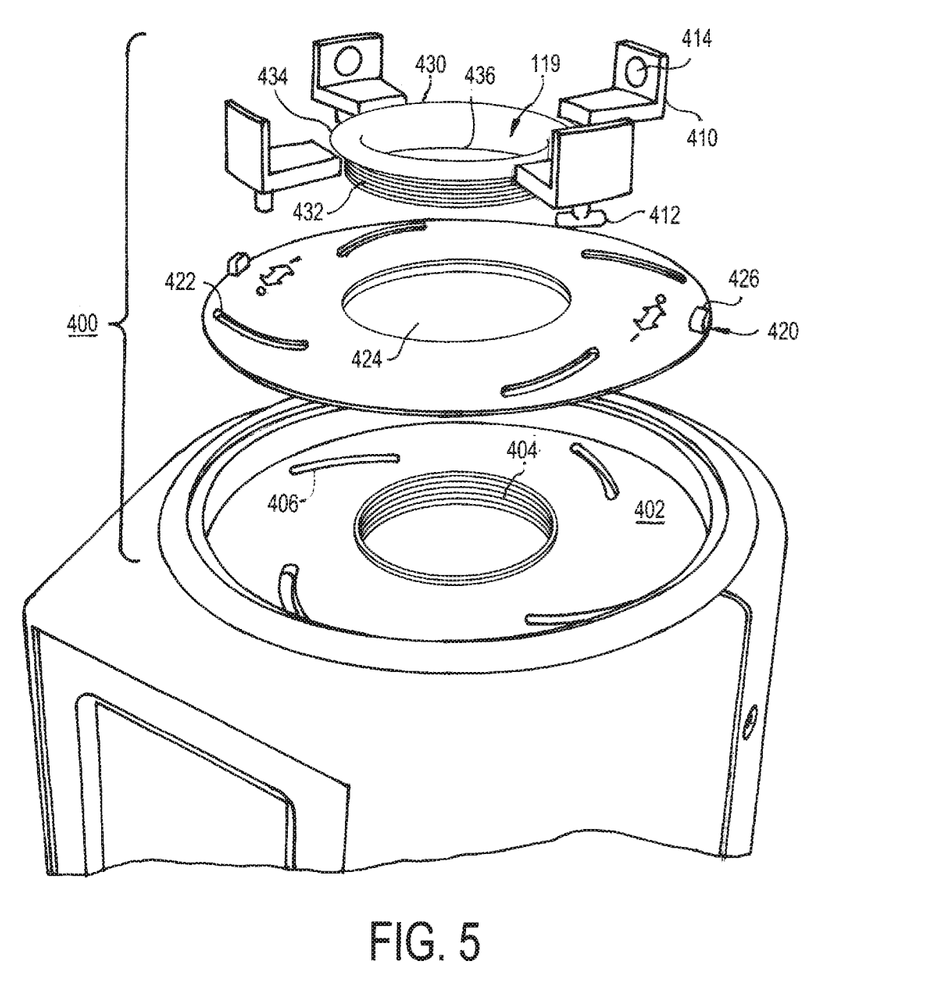
FIG. 5 is an exploded view of the retaining assembly.

Turning to FIG. 4B, a receiving or retaining assembly 400 is provided at the top 212 of the upper chamber (which is also the top of the sampling device 100). The retaining assembly 400 is fitted to a depressed section of the top 212 having a side wall 218 and a bottom. One or more projections 113 are formed in the side wall 218. As best shown in FIG. 5, the retaining assembly 400 is shown having a central securing member 430, a top plate or disk 420, and a bottom or bottom plate 402, and one or more clips 410.

Figure 6A:
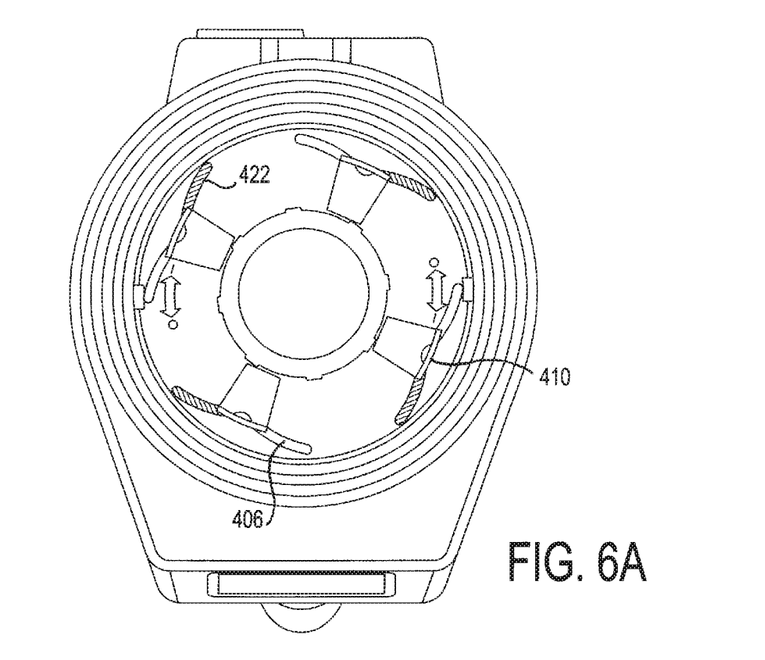
FIG. 6A is a top view of the device showing the atrium and media plate retaining assembly in an inner position.

The bottom plate 402 has one or more curved elongated grooves or bottom channels 406 that are formed as slots in the bottom plate 402. The bottom plate 402 is fixed at the top 212 of the housing 102. The top plate 420 has one or more curved elongated grooves or top channels 422 that are formed as slots in the top plate 420. The top plate 420 can rotate with respect to the bottom plate 402, which remains fixed to the housing 102. One or more handles 426 can be provided on the top surface of the top plate 420. The handles 426 extend upward from the top surface of the top plate 420, so that the user can grip or push on one or more (two in the embodiment of FIG. 5) of the handles 426 to rotate the top plate 420. Each one of the top channels 422 is aligned with and overlap with a respective one of the bottom channels 406; however the top channels 422 are flipped in orientation with respect to the bottom channels 406, as best shown in FIG. 6A, to form a Longworth chuck configuration. The channels 406, 422 are each a curved arc that together form a spiral-like shape. Small plastic or silicon bumpers can optionally be provided on the clip 410 that grip the agar plate 114 so that the plate 114 is compressed between the clips 410. The compression holds the agar plate 114 in position even when the device 100 is horizontal or inverted.

A clip 410 is positioned in each of the respective top and bottom channels 422, 406. The clip 410 has a bottom and a side formed perpendicular to the bottom to generally form an L-shape. A peg or support member 412 extends outward from the bottom of the clip 410. The support 412 has a neck and a head that forms an inverted T-shape, with the neck extending substantially perpendicular to the bottom of the clip 410 and the head is substantially perpendicular to the neck and parallel to the bottom of the clip 410. The neck of the support 412 extends through the top channel 422 and through the bottom channel 406. The head of the support 412 is wide and is positioned on the bottom side of the bottom channel 406. That locks the top plate 420 to the bottom plate 402 and also locks each clip 410 to the housing 102 and to a respective pair of bottom and top channels 406, 422. It is noted, however, that the head of the support member 412 need not sit on the opposite side of the bottom plate 402 and need not lock the plates 402, 420. Instead, the head of the support member 412 can just be received in the bottom channel 406 without extending through the bottom channel 406, so that the head can slide within the bottom channel 406.

Figure 6B:
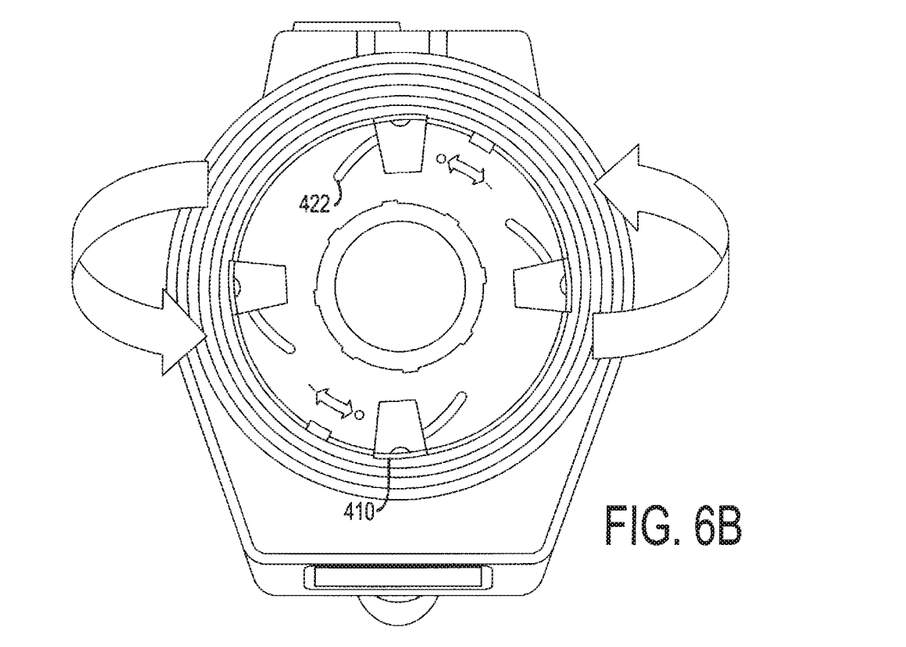
FIG. 6B is a top view of the device showing the atrium and media plate retaining assembly in an outer position.

As illustrated, the bottom and top channels 406, 422 extend slightly outward from the center so that the clip 410 moves toward and away from the center as the clip 410 slides left/right within the channels 406, 422. Each channel 406, 422 has an innermost position (closest to the central opening 119) and an outermost position (furthest from the central opening 119). As the clips 410 move in the channels 406, 422, the clips 410 continue to face in the same direction. That is, the side of the clip 410 faces the center and is substantially concentric (or parallel) to the central opening 119. As the top plate 420 rotates, all of the clips 410 move together simultaneously within their respective channels and are equidistant from the central opening 119. This provides a desired minimum and maximum diameter for the clips 410. Referring to FIG. 6A, the clips 410 are shown at an inner position where the clips 410 are situated in the innermost position of the respective channels 406, 422. In FIG. 6B, the clips 410 are shown at the outer position where the clips 410 are situated in the outermost position of the respective channels 406, 422. The clips 410 are moved between the inner and outer positions by rotating the top plate 420 with respect to the bottom plate 402. In one embodiment, the inner position can provide a diameter of 85 mm, and the outer position can provide a diameter of about 100 mm, which are common sizes for media plates.

The securing member 430 has a neck 432, wide head 434, and is ring-shaped to form a central opening 436. The bottom plate 402 and top plate 420 each have a respective central opening 404, 424. The plates 402, 420 are circular, and form a donut-shape with the central openings 404, 424. The bottom central opening 404 can be internally threaded. The neck 432 of the securing member 430 can be externally threaded to mate with the threaded central bottom opening 404.

The neck 432 extends through the top plate central opening 424 and threadably engages the bottom plate central opening 404, thereby locking the top plate 420 to the bottom plate 402, but allowing the top plate 420 to rotate with respect to the bottom plate 402. However, the securing member 430 sufficiently compresses the head of the support member 412 between the top plate 420 and the bottom plate 402 to provide enough friction so that the clips 410 stay in the position set by the user and grip the agar plate 114 without inadvertently sliding in the channels 406, 422 and thereby being locked in position. The securing member 430 can be curved to be ergonomic and tapered inward to facilitate the flow of air into the central opening 119 that extends through the securing member central opening 436, top plate central opening 424, and bottom plate central opening 404.

As further shown in FIG. 4B, a test or sampling device such as a Petri dish or Agar media plate 114 is provided having a test medium contained therein. The media plate 114 is placed on the bottom portion of the clips 410. The clips 410 hold the media plate 114 in place. The clips 410 slide in/out in the grooves 406, 422 so that the dish 114 snugly fits between the clips 410 and does not inadvertently come free from the clips 410, such as when the device 100 is turned horizontally. The media plate 114 can, for example, contain agar media that is designed to capture particulates in the air entering the device 100. The captured particulates can then be analyzed.

Thus, the adjustable clips 410 are configured to slide inwardly and outwardly along the diameter of the base of the atrium 110 to accommodate agar media plates 114 of varying diameters. Once the diameter is adjusted to match that of the agar media plate 114, the pegs 414 of the adjustable clips 410 can be moved from an unlocked position to a locked position, securing the agar media plate 114. The pegs 414 are positioned such that they grab the outer edge of the agar media plate 114. The pegs 414 each have a slight angle which, when the pegs 414 are positioned at roughly the diameter of the plate, causes an inward force against the walls of the agar media plate 114, securing it. Thus, the media plate 114 is press fit into the clips and is retained by the pegs 414.

Atrium 110

Referring to FIGS. 2, 4A, 4B, the atrium 110 is removably coupled to the top 212 of the sampling device 100 and is in direct air flow communication with the upper chamber 210. The atrium 110 has a cover plate 111 with a flat top and downwardly extending sides that are wider than the clips 410. A plurality of openings 112 are formed in the top of the cover plate 111. Referring to FIG. 4B, one or more locking slots or channels 112 are formed in the side of the cover plate 111. Each of the locking channels 112 is aligned with a respective projection 113 on the side wall 218 of the receiving portion 216. The locking channel 112 has a vertical portion and a horizontal portion.

To attach the atrium 110 to the housing 102, the user places the atrium 110 over the top of the media plate 114 so that the projection 113 enters the vertical portion of the locking channel 112. Once the projection is fully received in the vertical portion of the locking channel 112, the user can rotate the atrium 110 so that the projection 113 enters the horizontal portion of the locking channel 112, thereby removably locking the atrium 110 to the main housing 102 (FIG. 4A). The entire device 100 can be placed horizontally and the atrium 110 will continue to be fixed to the top 212 of the main housing 102. The user can remove the atrium 110 by twisting the atrium 110 and pulling outward, so that the projection slides out along the horizontal portion and then pulls out from the vertical portion of the locking channel 112.

Blower Assembly 500

Referring to FIG. 2, a blower assembly 500 is provided in the upper chamber 210 of the air sampling device 100. The blower assembly 500 has a blower housing 502 and a fan 504. The blower housing 502 is a plenum that conveys air. The plenum 502 has at least one wall and in the embodiment of FIG. 2 is cylindrical in the form of a tube with two open ends. The blower housing 502 can be a single integral device, or multiple separate discrete housings that are coupled together by lips 503, 505 extending outward at the end of each respective housing. Thus the top lip 503 of the first housing can be coupled to the top 112 of the housing 102, and the bottom lip 503 of the first housing can be coupled to the top lip 505 of the second housing, as shown. The bottom lip 505 of the second housing can be coupled to the mass flow detector or detector adapter. A gasket can optionally be provided between the lips 503, 505 and the respective connections to provide an airtight seal therebetween so air does not leak out of the plenum 502. Thus, the plenum 502 has a top end and a bottom end opposite the top end. The top end of the plenum 502 is coupled to the top of the housing 102 about the central opening 119, so that the plenum 502 is in air flow communication with the retaining assembly 400 and atrium 110. The plenum 502 is substantially the same size as the central opening 119, and perhaps slightly larger. Thus, the fan 504 to pull air directly through the atrium 110 and retaining assembly 400 via the central opening 119.

A fan 504 is located inside the plenum 502. The fan 504 has a center support rod and fan blades 506. The center rod has a longitudinal axis that extends substantially parallel to the longitudinal axis of the sampling device 100. The fan blades 506 extend outward from the center rod and are configured to draw air down (in the embodiment of FIG. 2, when the sampling device 100 is standing vertical or upright) through the plenum 502. The upper chamber 210 is sized and shaped to accommodate and match standard sized and shaped agar media plates 114, as well as the electronic components in the bottom chamber 250.

Figure 7B:
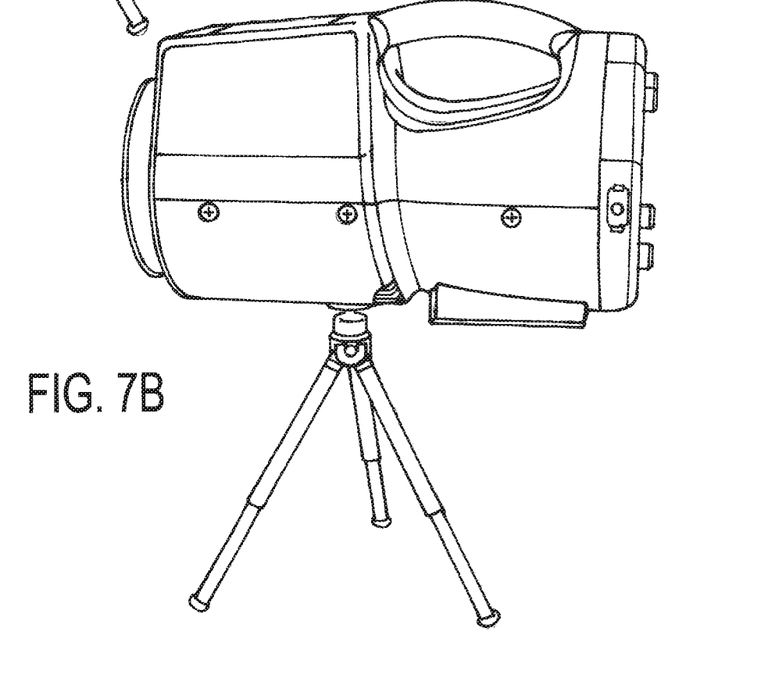
FIG. 7B shows the device in a horizontal position and installed on a tripod.

Thus, the blower assembly 500 is elongated and has a longitudinal axis that is parallel to the longitudinal axis of the sampling device 100 and that is substantially coaxial with the opening 119, as seen in FIG. 2. Accordingly, the longitudinal axis of the blower assembly 500 (including the fan 504 and plenum 502) is vertical when the sampling device 100 is vertical (FIG. 7A), and is horizontal when the sampling 100 device is horizontal (FIG. 7B). The plenum 502 and fan 504 can be smaller than the media plate 114 to create an air flow through the atrium 111 that provides reliable test results for the media plate 114. As shown, the plenum 502 and fan 504 can be about half the size of the media plate 114, and is centrally located with respect to the media plate 114.

Mass Flow Meter 600

A mass flow meter 600 is also located in the upper chamber 210, and is positioned immediately and directly below the blower assembly 500. The mass flow meter has an input 602 at a top end and an output 604 at a bottom end. The input 602 is coupled to the bottom open end of the plenum 502 and is in unobstructed air communication with the plenum 502. Thus, the mass flow meter 600 directly receives the air flow passing through the plenum 502. If the bottom end of the plenum 502 is larger than the input 602 of the mass flow meter 600, an adapter 603 can optionally be provided to maintain an airtight seal between the bottom of the plenum 502 and the input 602 of the mass flow meter 600, as shown.

The mass flow meter 600 measures the rate of air flow coming into the sampling device 100 through the atrium 110, striking the media plate 114, through the plenum 502, and into the input 602. Once air exits the output 604 of the mass flow meter 600, it enters the upper chamber 210 and exits via the vent 121 in the housing 102.

As shown, the upper chamber 210 contains an operator display and/or control panel 302, the blower assembly 500 and the mass flow meter 600. The control panel 302 is an electronic touch display that enables the user to control operation of the sampling device 100. The control panel 302 is affixed to the housing 102 and can optionally extend into the upper chamber 210, for example. However, the control panel 302 forms an air and/or liquid tight seal with the housing 102 so that air does not leak out of the upper chamber 210.

Electronic Component Assembly 300

All other electronic components 300 (besides the control panel 302, blower assembly 500 and mass flow meter 600) are contained in the lower chamber 250. That provides stability to the sampling device 100 and reduces the width/diameter of the sampling device 100. The electronic component assembly 300 can include, for example, a controller 304, power supply (batteries), and a motor 306. In certain embodiments, the controller may be a computer or processing device such as a processor or ASIC. The controller 304 operates the fan 504, mass flow meter 600, and control panel 302. It receives 304 operator control signals from the control panel 302, such as to start and stop test, set test parameters (time, flow rate, etc.). The controller 304 also displays information about operation of the sampling device 100 on the control panel 302, such as flow rate, testing time, and remaining test time. The controller 304 can also communicate with remote devices, such as controllers 304 in other sampling device 100 or a personal computer, network or smart phone, either by hard wire or wirelessly.

Thus, the controller 304 runs the fan 504 and the mass flow meter 600 of the air sampling device 100. When the sampling process is engaged, the system attempts to generate the desired flow rate. The mass flow meter 600 continually reports the instantaneous flow rate through the system to the controller 304. The controller 304 evaluates whether the measured flow rate is equal to the desired flow rate (usually 1 cfm). The difference between the desired flow rate and the measured flow rate is known as the error. If the desired flow rate is greater than the measured flow rate, the controller 304 will increase the frequency of fan 504 revolutions to generate a higher flow rate. If the desired flow rate is less than the measured flow rate, the controller 304 will decrease the frequency of the fan 504 revolutions to generate a smaller flow rate. This process may be repeated continuously (many times per second or nonstop) or at regular intervals. The process of evaluating a system's output and modifying the systems input provides a closed-loop control. A proportional-integral-differential ("PID") control algorithm is used by the controller 304 to minimize and maintain a low system error. The air sampling device 100 preferably uses this control method to adjust the fan speed based on the instantaneous flow rate. Accordingly, controller 304 controls the fan 504 speed in real time without delay or manual interaction, based on the real time feedback provided by the mass flow meter 600.

In one exemplary embodiment, the controller 304 can be networked and connected to the Internet via TCP/IP networking using IEEE 802.3 (wired), IEEE 802.11 (wireless), and IEEE 802.15.4 (wireless for Bluetooth) physical and data link standards. In alternative embodiments, the controller 304 may receive and send commands remotely through the network. Through the network, the air sampling device 100 can be monitored and controlled remotely using networked devices and applications, such as a processing device (smart phone, computer, etc.). The air sampling device 100 can also export event history to a removable USB flash drive. The flash drive and USB connection terminal can be accessed through a controller access panel 131 (FIG. 1) that is flat and supports the device 100 in a horizontal position. Event history includes sampling events, calibration events, and administrative events. In one embodiment, the device 100 can be integrated with the networks and central processing device to facilitate monitoring and control from a central location, such as those shown in U.S. Pat. Nos. 9,285,792, 9,063,040, 9,046,453, and U.S. Patent Publication No. 2016/0061796. The content of those patents and applications is hereby incorporated by reference.

Ventilation Slots 121 and Port Adapter 650

Referring to FIG. 1, an elongated ventilation slot 121 is located at bottom rear of the upper housing body 120. The ventilation slot 121 can have vertical members that are integrally formed with the housing 102 to create a plurality of slots and provide safety. An exhaust port adapter 650 can optionally be provided that mates with the ventilation slots 121. The adapter 650 has a base 652 and a nozzle 654. The base 652 has the same shape as the ventilation slot 121. The base 652 covers and couples with the slot 121 in an airtight manner to prevent air from leaking out of the housing 102 except through the nozzle 654. The nozzle 654 projects outward from the base 652 and has a center opening that extends through the nozzle 654 and base 652.

A tube can be attached to the nozzle 654 to transport exhausted air to a remote location outside of the clean environment. Accordingly, air from the upper chamber 210 is exhausted through the nozzle 654 and into the tube.

The exhaust port adapter 650 removably mates with the ventilation slots 121 through an exhaust mating mechanism 656. The exhaust mating mechanism 656 can male members (such as spring-biased arms or the like) which slide into and couple with the female ventilation slots 121 and grip the vertical supports. The exhaust nozzle 654 is exemplarily shown as a substantially cylindrical output nozzle, but may be of any shape that allows for the attachment of tubing. In certain embodiments, the exhaust nozzle 654 may allow for the use of clamps to secure tubing and create an airtight seal. In other embodiments, the outside of the exhaust nozzle 654 may be ribbed and tapered to allow for tubing to form an airtight seal by being pushed against it.

In yet another alternative embodiment of the invention, the ventilation slot 121 can be an opening in the housing 102 and a separate grill can be provided that is fastened into the slot 121 (such as by a fastening mechanism or friction fit) and can be removed and replaced with an exhaust adapter 650.

Accordingly, the ventilation opening or slot 121 and/or the exhaust port adapter 650 allow for air passing through the air sampling device 100 to exit to the external environment. The air enters through openings in the atrium 110 at the top of the upper body 120, and exits through the ventilation slot 121 at the rear of the upper body 120. The ventilation slot 121 can be positioned at the bottom part at the rear of the upper body 120, to provide a direct and continuous air flow through the sampling device 100.

Operation—Air Flow

Figure 3A:
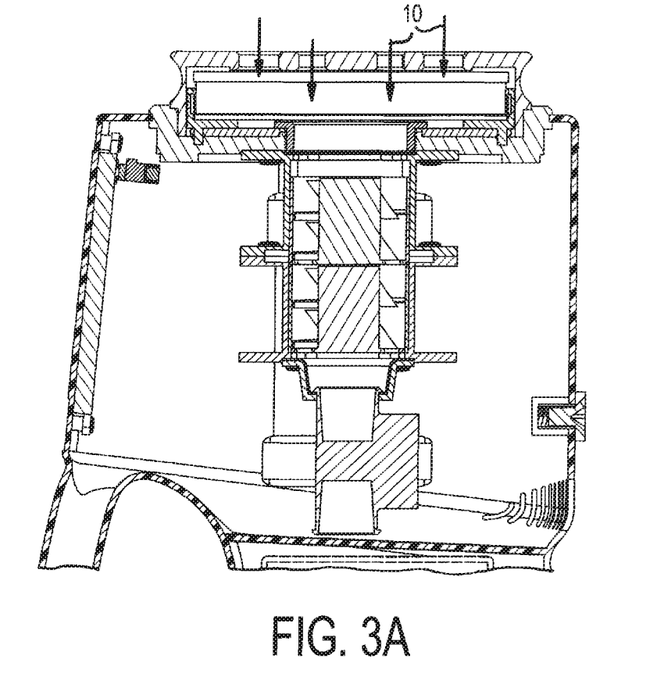
FIG. 3A is an exemplary embodiment of the invention, showing an internal cross-sectional view of the upper chamber of the air sampling device, showing air entering the device.
Figure 3B:
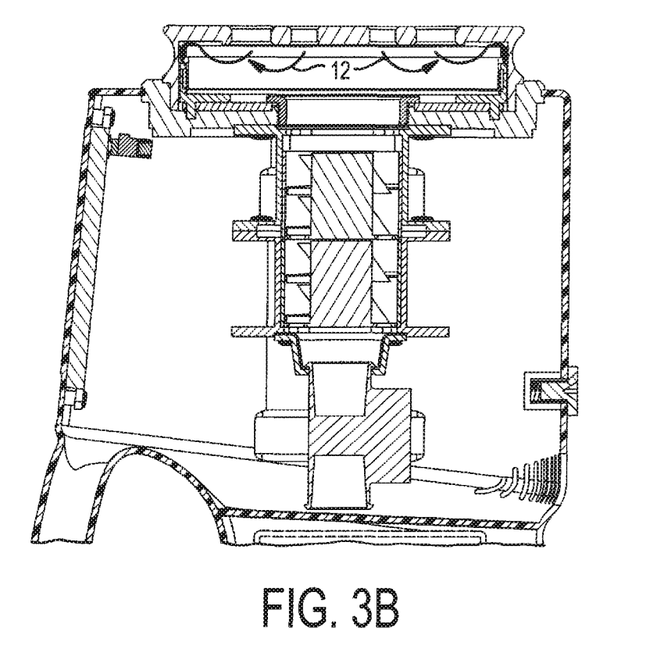
FIG. 3B is an exemplary embodiment of the invention, showing an internal cross-sectional view of the upper chamber of the air sampling device, showing air impinging on the media plate.

The operation of the air sampling device 100 will now be discussed with respect to FIGS. 2, 3A-3D. Operation begins when an operator sets a sampling test parameter and presses start, or when a previously set test is programmed to begin (such as every 4 hours). At that point, the controller 304 starts the fan 504 to operate. The fan 504 pulls air into the sampling device 100 via the atrium openings 112, as shown by the arrows showing the air flow 10 (FIG. 3A), and draws air across the agar media plate 114, air flow arrows 12 (FIG. 3B). The air strikes the media plate 114 and passes around the plate 114, underneath the plate 114 (as shown in FIG. 2, there is a space between the bottom of the media plate 114 and the bottom 402 and also between the bottom of the media plate 114 and the top of the securing member 430) and exits through the central opening 119 in the retaining assembly 400, as shown by air flow arrows 14 (FIG. 3C).

It is noted that the speed of the air entering the system through each opening 112 is a function of the speed of the fan 504 as well as the diameter and number of openings 112 in the atrium 110. As air enters the region below the openings 112 (air flow 12, FIG. 3B), it is redirected toward the nearest vacuum source, the central opening 119. The initial direction of air flow 10 (FIG. 3A), and the new direction of the air flow 12 (FIG. 3B), are nearly perpendicular. When the air is redirected, many fast-moving particles within the air cannot be redirected so abruptly due to their inertia. These particles roughly continue their initial direction and impinge the agar media plate 114 where the individual particles remain. The focus of this process is to accumulate these particles within the agar, where they can be analyzed at a later time. The redirected air is drawn laterally outward across the agar-side of the agar media plate 114, over its edges, down the outside of its exterior walls, and laterally inward across the bottom-side of the plate 114 until it is drawn through the central opening 119.

Figure 3C:
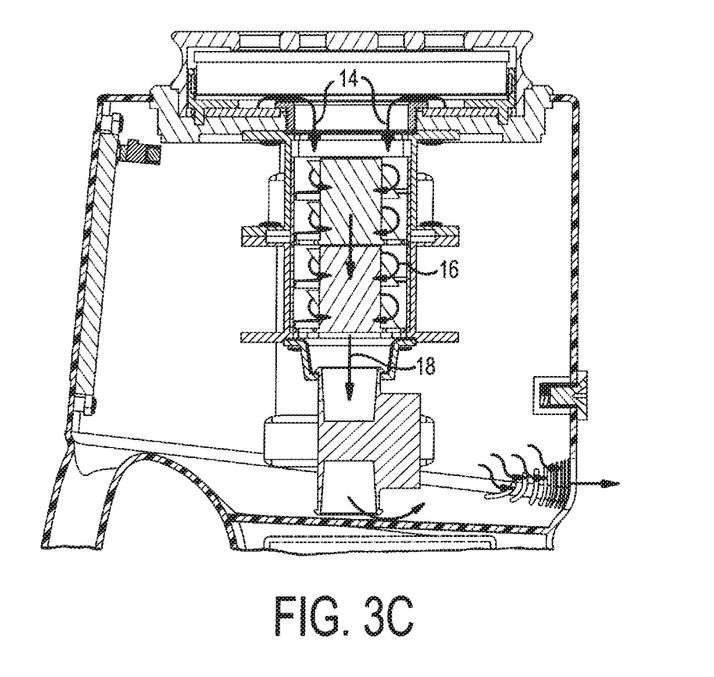
FIG. 3C is an exemplary embodiment of the invention, showing an internal cross-sectional view of the upper chamber of the air sampling device, showing air moving past the fan, the mass flow meter, and exiting the device through ventilation slots.

Once the air flow passes through the atrium 110 (air flow 10) and retaining assembly 400 through the central opening 119 (air flow 14), it enters into the plenum 502 situated inside the upper chamber 210 of the air sampling device 100, as shown by the arrows for air flow 16 (FIG. 3C). The air enters directly from the central opening 119 into the open top end of the plenum 502 (air flow 14). The fan 504 pushes the air through the plenum 502 (air flow 16) until it exits the open bottom end of the plenum 502 (air flow 18). The air continues through the adapter 603 (if one is used) to the input 602 of the mass flow meter 600. The mass flow meter 600 constantly measures the rate of the air flow 18 and provides a measured air flow rate signal with the measured air flow rate to the controller 304. The controller 304 will continuously read the measurement signal and adjust the speed of the fan 504 to account for any difference between the measured air flow rate and a desired air flow rate.

The air flow continues through the mass flow meter 600 and exits through the output 604, as shown by the arrows for air flow. As shown in FIG. 3C, the air flow exits the mass flow meter 600 into the upper chamber 210. As the upper chamber 210 becomes pressurized (relative to ambient pressure), air is exhausted through ventilation slot 121 to the exterior of the device 100. The optional partition wall 125 prevents air from entering the lower chamber 250 so that the lower chamber 250 and electronics 300 do not interfere with the air flow. Since the motor 306 is part of the fan assembly 504, it does not need to be cooled. The exhausted air exits the air sampling device 100 substantially parallel to the orientation at which it entered in order to maintain laminar flow within the environment. It is exhausted outside of the sampling device 100 and the housing 102 through the ventilation slot 121 at the rear of the upper chamber 210. In an alternative embodiment, a plenum or tube can connect the output 604 of the mass flow meter 600 to the ventilation slot 121.

Figure 3D:
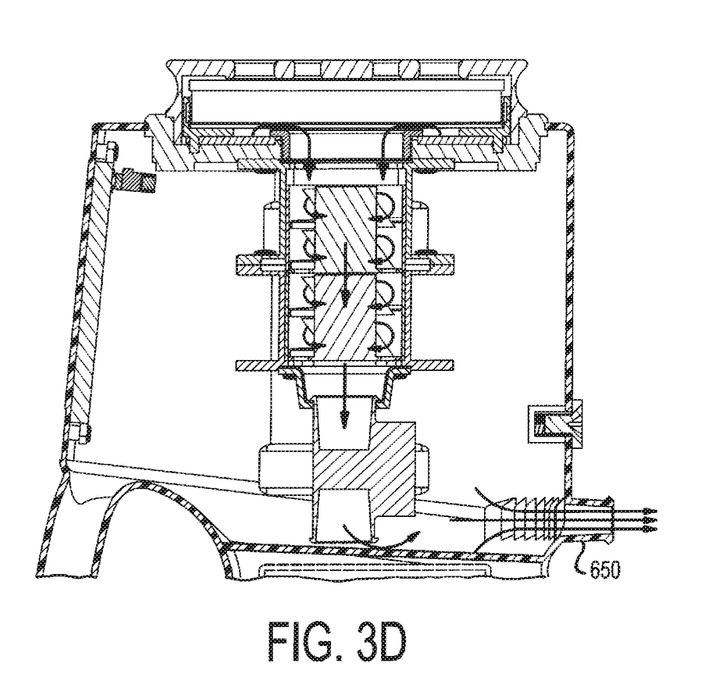
FIG. 3D is an exemplary embodiment of the invention, showing an internal cross-sectional view of the upper chamber of the air sampling device, showing air moving past the fan, the mass flow meter, and exiting the device through the exhaust port.

As shown in the alternative exemplary embodiment of FIG. 3D, an exhaust plug can replace or be attached to the ventilation slot 121 so that the air flow 20 is exhausted through the port adapter 650. A tube can be connected to the nozzle 654 of the port adapter 650 to transport the air to a remote location outside the clean environment, where it is finally disposed or exhausted. Thus, air passes through the ventilation slot 121 and/or the port adapter 650 and is redirected into the attached tubing.

It is noted that the sampling device 100 and its various components, are shown to have a generally cylindrical shape. For instance, the atrium 110, retaining assembly 400, top plate 420, bottom plate 402, media plate 114, securing member 430, and blower assembly 212 are all cylindrical. It will be appreciated that the invention does not need to be configured to be cylindrical or circular, and that other shapes can be provided within the spirit and scope of the invention.

The description uses several geometric or relational terms, such as circular, rounded, tapered, parallel, perpendicular, concentric, arc, and flat. In addition, the description uses several directional or positioning terms and the like, such as top, bottom, left, right, up, down, inner, and outer. Those terms are merely for convenience to facilitate the description based on the embodiments shown in the figures. Those terms are not intended to limit the invention. Thus, it should be recognized that the invention can be described in other ways without those geometric, relational, directional or positioning terms. In addition, the geometric or relational terms may not be exact. For instance, walls may not be exactly perpendicular or parallel to one another but still be considered to be substantially perpendicular or parallel because of, for example, roughness of surfaces, tolerances allowed in manufacturing, etc. And, other suitable geometries and relationships can be provided without departing from the spirit and scope of the invention.

In addition, the sampling device 100 includes operation by a one or more processing devices, such as the controller 304. It is noted that the processing device can be any suitable device, such as a processor, microprocessor, PC, tablet, smartphone, or the like. The processing devices can be used in combination with other suitable components, such as a display device (monitor, LED screen, digital screen, etc.), memory or storage device, input device (touchscreen, keyboard, pointing device such as a mouse), wireless module (for RF, Bluetooth, infrared, WiFi, Zigbee, etc.). Information operated on or output by the processing device may be stored on a hard drive, flash drive, on a CD ROM disk or on any other appropriate data storage device, which can be located at or in communication with the processing device. The entire process is conducted automatically by the processing device, and without any manual interaction. Accordingly, unless indicated otherwise the process can occur substantially in real time without any delays or manual action.

Within this specification, the terms "substantially" and "about" mean plus or minus 20%, more preferably plus or minus 10%, even more preferably plus or minus 5%, most preferably plus or minus 2%.

Within this specification embodiments have been described in a way which enables a clear and concise specification to be written, but it is intended and will be appreciated that embodiments may be variously combined or separated without departing from spirit and scope of the invention. For example, it will be appreciated that all preferred features described herein are applicable to all aspects of the invention described herein.

The air sampling device 100 is especially useful for use in a controlled environment. It can be made of materials that are suitable for use in a controlled environment. However, the sampling device 100 can be utilized in other environments.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. An air sampling device for sampling air in a controlled environment comprising:
   a housing body having a top and a side;
   an opening at the top of said housing body;
   a retaining assembly configured to retain a sampling device, said retaining assembly located at the top of said housing body about said opening;
   a linear plenum having housing with an open top end and an open bottom end linear with said open top end, said housing defining a longitudinal axis of the plenum, said longitudinal axis being substantially parallel to a longitudinal axis of said housing body, said open top end being coupled to the top of the housing body about said opening such that said longitudinal axis of said plenum is substantially coaxial with said opening whereby said plenum is in linear flow communication with said opening;
   a mass flow meter having an input and an output, said input coupled to the open bottom end of said housing of said plenum and in linear flow communication with said plenum; and
   a blower disposed inside of said housing of said plenum and configured to draw air linearly past the sampling device, linearly through the opening, linearly through the plenum, and linearly through the mass flow meter, thereby allowing the air to move down longitudinally in the blower.

2. The air sampling device of claim 1, said mass flow meter detecting a flow rate of air through the mass flow meter.

3. The air sampling device of claim 2, further comprising a processing device receiving a detected flow rate from said mass flow meter and controlling a speed of said blower in response to the detected flow rate.

4. The air sampling device of claim 3, wherein said processing device increases the speed of said blower if the detected flow rate is lower than a desired flow rate, and decreases the speed of said blower if the detected flow rate is higher than a desired flow rate.

5. The air sampling device of claim 1, further comprising an atrium coupled to said housing body to enclose the sampling device.

6. The air sampling device of claim 5, said atrium having a locking mechanism for releasably locking the atrium to said housing body.

7. The air sampling device of claim 5, said atrium having a locking slot and said housing body having a projection releasably engaging the locking slot to releasably lock said atrium to said housing body.

8. The air sampling device of claim 1, said retaining assembly having a one or more adjustable clips to engage the sampling device, said adjustable clips having an inner position and an outer position to engage different sizes of sampling devices.

9. The air sampling device of claim 1, said housing body having a vent to exhaust air from the output of said mass flow meter.

10. The air sampling device of claim 9, further comprising a vent adapter configured to removably couple with said vent, said vent adapter having a nozzle configured to couple with a tubing to exhaust air from the output of said mass flow meter into the tubing to a remote location.

11. The air sampling device of claim 1, further comprising a processing device configured to log sampling events, calibration events, and/or administrative events.

12. The air sampling device of claim 11, said processing device in communication with a remote network and communicating the sampling events, calibration events, and administrative events to the remote network.

13. The air sampling device of claim 1, wherein said housing body and said plenum are cylindrical and said opening is circular.

14. An air sampling device for sampling air in a controlled environment comprising:
a housing body having upper and lower chamber, said upper and lower chambers being divided by a partition in the housing body, the partition being a wall configured to prevent air in the upper chamber from entering the lower chamber of the housing body;
an opening at the top of said upper chamber of said housing body;
a retaining assembly configured to retain a sampling device, said retaining assembly located at the top of said upper chamber of said housing body about said opening;
a plenum having a top end and opposite bottom end, said plenum defining a longitudinal axis that is substantially parallel to a longitudinal axis of said housing body, said top end being coupled to the top of said upper chamber of said housing body about said opening thereof such that said longitudinal axis of said plenum is substantially coaxial with said opening, whereby said plenum is in flow communication with said opening;
a mass flow meter having an input and an output, said input being coupled to the bottom end of said plenum and in flow communication with said plenum;
a blower inside of said plenum and configured to draw air past the sampling device, through the opening, through the plenum, and through the mass flow meter, thereby allowing the air to move down longitudinally in the blower; and
a processing device located in the lower chamber of the housing body, the processing device being configured to receive a detected flow rate from said mass flow meter and control a speed of the blower in response to the detected flow rate.

15. The air sampling device of claim 14, wherein the upper chamber of the housing body includes a vent and a tube is coupled to the vent to transport the air to a location outside of the clean room.

16. The air sampling device of claim 14, wherein the housing body includes a handle.

17. The air sampling device of claim 16, wherein the vent is an elongated ventilation slot located at bottom rear of the upper chamber of the housing body.

* * * * *